(12) United States Patent
Ryder et al.

(10) Patent No.: US 7,641,362 B2
(45) Date of Patent: Jan. 5, 2010

(54) ELECTRONIC DEVICE LIGHTING SYSTEM

(75) Inventors: Brian D. Ryder, Tomball, TX (US); Jeffrey A. Lev, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/799,270

(22) Filed: Apr. 30, 2007

(65) Prior Publication Data

US 2008/0266864 A1    Oct. 30, 2008

(51) Int. Cl.
    *F21V 33/00*    (2006.01)
(52) U.S. Cl. .................. 362/253; 362/282; 362/293; 362/321
(58) Field of Classification Search ............. 362/321, 362/253, 293; 361/679.04–679.06, 679.21, 361/679.29
    See application file for complete search history.

(56) References Cited

U.S. PATENT DOCUMENTS

| | | | |
|---|---|---|---|
| 3,205,763 A * | 9/1965 | Bradley | 356/332 |
| 4,355,347 A * | 10/1982 | Guthrie | 362/30 |
| 4,900,134 A | 2/1990 | Inoue et al. | |
| 5,671,035 A | 9/1997 | Barnes | |
| 5,841,507 A | 11/1998 | Barnes | |
| 6,150,774 A | 11/2000 | Mueller et al. | |
| 6,322,234 B1 * | 11/2001 | Drake et al. | 362/276 |
| 6,710,763 B1 | 3/2004 | Iinuma | |
| 6,909,355 B2 | 6/2005 | Hashimoto et al. | |
| 7,029,151 B2 | 4/2006 | Strazzanti | |
| 2003/0137844 A1 * | 7/2003 | Bucher et al. | 362/293 |
| 2005/0002038 A1 | 1/2005 | Sakaino et al. | |
| 2005/0231948 A1 | 10/2005 | Pohlert et al. | |

* cited by examiner

*Primary Examiner*—Laura Tso

(57) ABSTRACT

A lighting system for an electronic device comprising at least one movable lens to cover a light source.

16 Claims, 2 Drawing Sheets

ELECTRONIC DEVICE LIGHTING SYSTEM

BACKGROUND

Pulse width modulators (PWM) are commonly used to control the intensity or brightness level of a light emitting diode (LED) or other light. However, PWMs increase the cost and complexity of a system because of the additional circuitry and software instructions that are associated with managing the PWMs. Additionally, PWMs require additional power which in certain circumstances is scarce.

DETAILED DESCRIPTION OF THE DRAWINGS

Figure 1A:
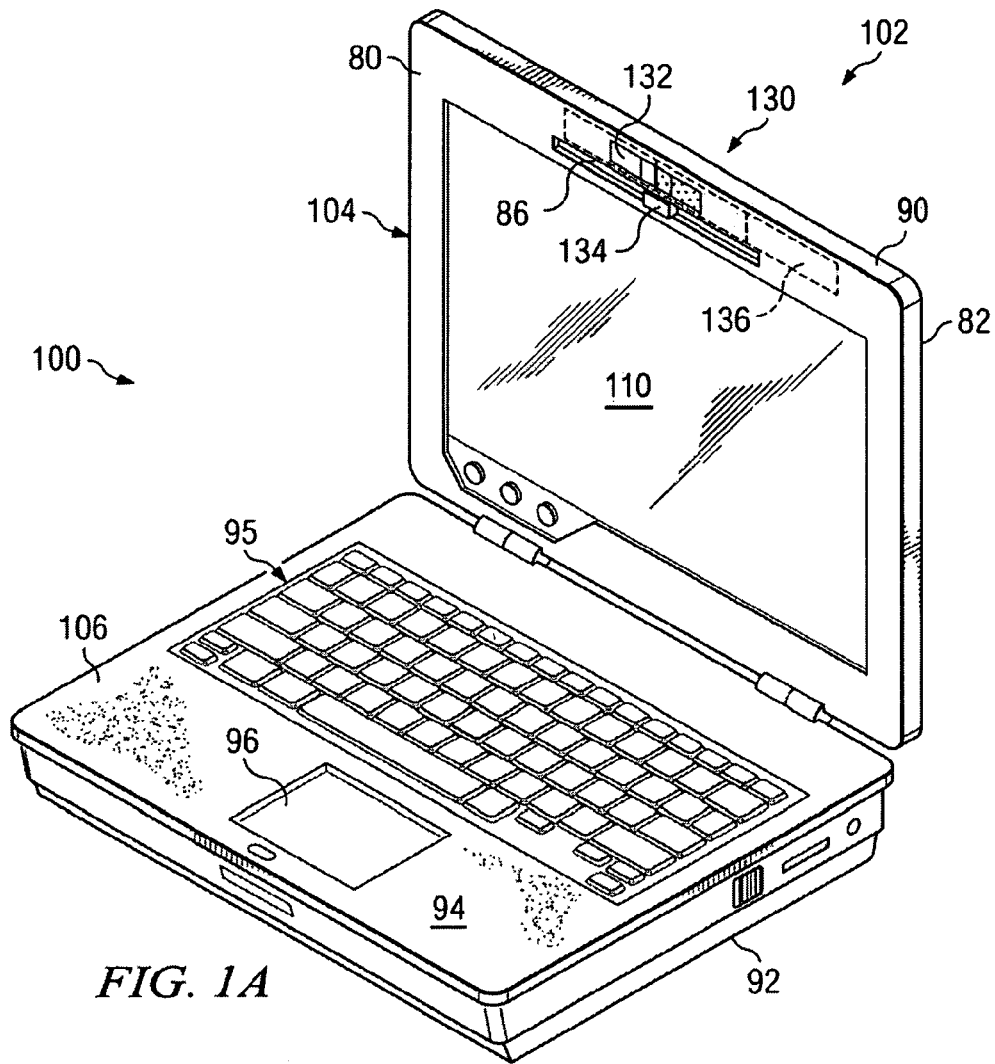
FIGS. 1A and 1B depict an electronic device employing an embodiment of a lighting system.
Figure 1B:
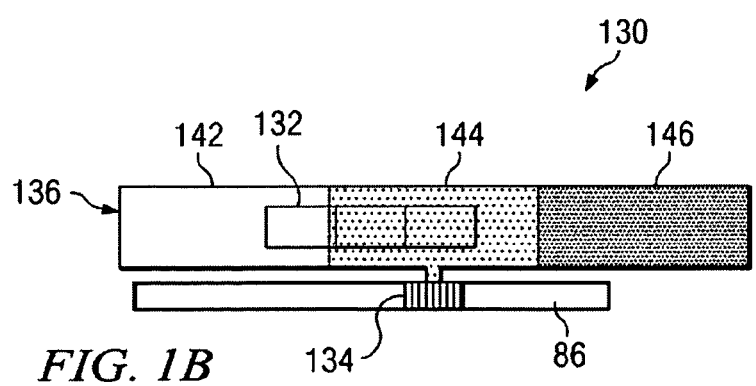

FIGS. 1A and 1B depict an electronic device 100 comprising an embodiment of a lighting system 130. In the illustrated embodiment, electronic device 100 is a laptop computer 102. However, it should be noted that electronic device 100 can be any type of electronic device such as, but not limited to, an automobile dashboard display, a desktop computer, a tablet computer, a personal digital assistant (PDA), a telephone, a cellular phone, or any other type of electronic device.

In the illustrated embodiment, electronic device 100 comprises a display member 104 rotably coupled to a base member 106. Display member 104 and base member 106 each comprise housings 90 and 92, respectively, for housing and/or supporting one or more components of electronic device 100. For example, in the illustrative embodiment, housing 90 comprises a top cover 80 and a back cover 82 for supporting a display screen 110. Base member 106 comprises interfaces for various user interface components (e.g., printer, mouse, and connections to other peripheral devices). For example, in the embodiment illustrated in FIG. 1A, base member 106 comprises a working surface 94 having a keyboard 95 and a touchpad 96; however, it should be understood that additional and/or different components and/or interfaces may be disposed and/or otherwise reside on working surface 94.

In the embodiment illustrated in FIG. 1A, lighting system 130 is disposed in top cover 80 of housing 102 at a location above display screen 110. However, it should be understood that lighting system 130 may be otherwise located display member 104 and/or on any surface or edge of base member 106. Lighting system 100 may be internally or externally coupled to housing 102. Internally coupled means that lighting system 130 is integrated into and/or otherwise forms a part of housing 90 and/or housing 92 (e.g., secured within housing 90 or 92). Externally coupled means that lighting system 130 is a separate device (e.g., a lamp or other similar light fixture) which can be mechanically coupled (e.g., screwed, clipped, or installed) to an external surface of housing 90 and/or housing 92 (e.g., surface 84 of display member 104).

Referring to FIG. 1B, in the embodiment illustrated, lighting system 130 comprises a light source 132, a slider 134, and a lens 136. Lighting system 130 illuminates or provides light to at least a portion of electronic device 100 (e.g., working surface 94). Light source 132 is any type of illumination device (e.g., a light bulb or a light emitting diode (LED)) and can transmit light from any portion of the visible light spectrum. Light source 132 can be any type of light (e.g., fluorescent light or incandescent light) and emit any color or shade of color (e.g., a natural white, bright white, red, blue, yellow, etc.).

Slider 134 is an embodiment of a shutter assembly for lighting system 130. A shutter assembly is any single or set of components which controls the intensity of light outputted by lighting system 130. Slider 134 may be implemented as a mechanical-only or an electromechanical device. A portion of slider 134 moves laterally in a slot 86 disposed in top cover 80 of housing 102. In the illustrative embodiment, slider 134 is coupled to a lens 136 and is used to change the intensity level of the light outputted by lighting system 130. Lens 136 is a component enabling the transmission of light but is also treated to block all or a portion of the light from passing through. For example, lens 136 can comprise glass or any type of optical grade plastic. Lens 136 can be treated by any type of process, such as a chemical or polarization treatment. The treatment adds a tint or color to lens 136, thereby changing the amount of light or the color of the light being transmitted through lens 136. Thus, in some embodiments, lens 136 can comprise a plurality of different colors for changing the amount of light or the color of the light being transmitted through lens 136.

In the embodiment illustrated in FIG. 1B, lens 136 is configured to have different opacity portions 142, 144, and 146. Opacity is the level or degree to which light can penetrate. Thus, for example, if lens 136 is completely opaque, then light cannot penetrate lens 136 and no light (i.e., no light or virtually no light) is outputted by lighting system 130. On the other hand, if lens 136 is not opaque or is transparent/translucent, then a substantial portion of the light is transmitted through lens 136. In the illustrative embodiment, opacity portion 142 is completely transparent/translucent, opacity portion 144 is a medium transparency/translucency, and opacity portion 146 is the darkest or least transparent/translucent of opacity portions 142, 144, and 146.

Thus, in application, slider 134 slides lens 136 over light system 130. Thus, as lens 136 moves from opacity portion 142 to opacity portion 144, the opacity level of lens 136 increases and the amount of light emitted by light system 130 decreases. However, it should be noted that lens 136 can comprise any opacity range from completely transparent to completely dark and can include any range in-between. Furthermore, lens 136 can comprise more or fewer opacity portions.

Figure 2:
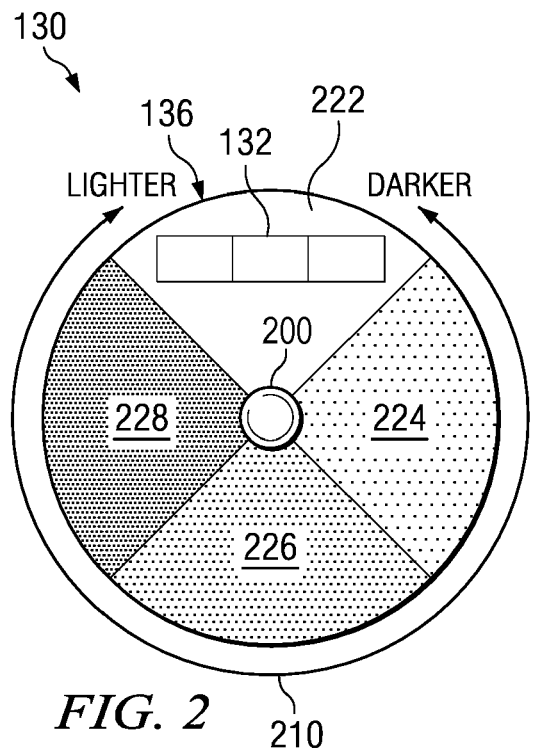
FIG. 2 is another diagram illustrating an embodiment of a lighting system.

FIG. 2 illustrates another embodiment of lighting system 130 for electronic device 100. In FIG. 2, lighting system 130 comprises light source 132, lens 136, a knob 200, and an indicator 210. In the illustrated embodiment, lens 136 is circular in shape. However, it should be noted, that lens 136 can be any desired shape (e.g., a rectangle as illustrated in FIG. 1 or other shape) configured having a plurality of opacity portions. In the illustrative embodiment, knob 200 is a rotating mechanical or electromechanical shutter assembly that controls the intensity level of the light outputted by lighting system 130. It should be noted, however, that knob 200 may be implemented as any rotating device (e.g., a thumbwheel). In the illustrative embodiment, knob 200 is disposed in the center of lighting system 300. However, it should be noted that knob 200 can be disposed in any location, as long as knob 200 can control and/or support the movement of lens 136. Knob 200 may be rotably coupled to housing 90 or housing 92.

In the illustrative embodiment, lens 136 comprises opacity portions 222, 224, 226, and 228, with the opacity level of lens 136 increasing as lens 136 moves from opacity portion 222 to opacity portion 228. Opacity portion 222 is the lightest or most transparent section, while opacity portion 228 is the darkest and least transparent section. Knob 200 is coupled to lens 136 and enables lens 136 to be variably positioned over light source 132, thereby changing the amount of light emitted from light system 130. Knob 200 may rotate in one direction or two directions. Indicator 210 identifies the directions lens 136 may be moved or rotated to obtain different levels of light intensity. Thus, if knob 200 is rotated clock-wise, then lens 136 changes position such that the opacity level grows "lighter" and the light intensity of the light outputted by lighting system 130 increases. If knob 200 is rotated counter clock-wise, then lens 136 changes position such that the opacity level grows "darker" and the light intensity of the light outputted by lighting system 130 decreases. It should be noted, however, that electronic device 100 may omit indicator 210, or indicator 210 may be represented in another form (e.g., a position indicator).

Figure 3:
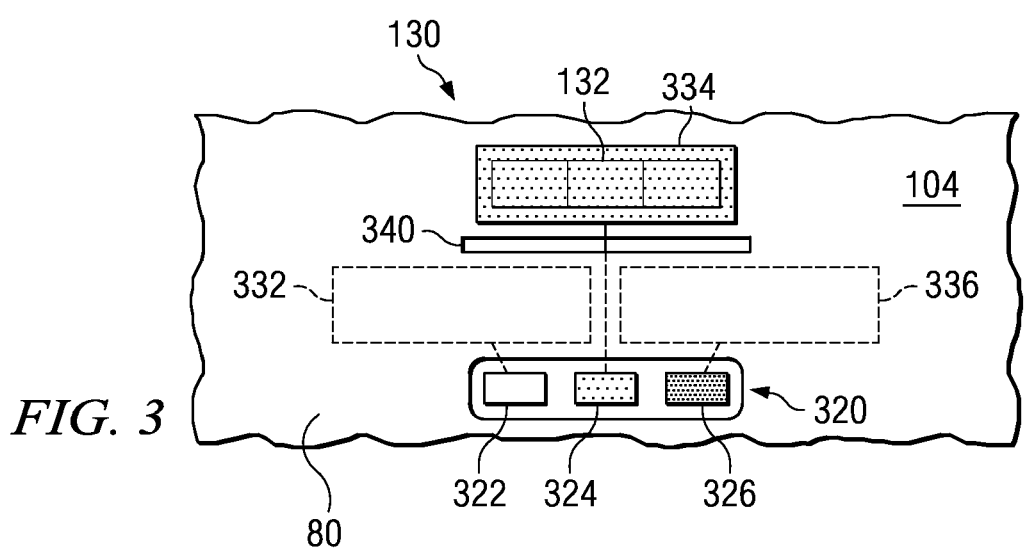
FIG. 3 is another diagram illustrating an embodiment of a lighting system.

FIG. 3 illustrates another embodiment of lighting system 130 for electronic device 100. In FIG. 3, lighting system 130 comprises light source 132, an interface 320, and lenses 332, 334, and 336. Interface 320 is a mechanical or electromechanical shutter assembly that controls the intensity level of the light outputted by lighting system 130. In the illustrative embodiment, interface 320 comprises buttons 322, 324, and 326 which correspond to lens 332, 334, and 336, respectively. Interface 320 is a mechanical or electromechanical shutter assembly which controls and manages which lens, 332, 334, or 336, is disposed over and/or in front of light source 132. Lenses 332, 334, and 336 each comprise a different opacity level, with lens 332 being the most transparent and lens 336 being the most opaque. In the illustrative embodiment, lens 332, 334, and 336 are each separate lenses and are not coupled to each other.

In some embodiments, lenses 332, 334, and 336 are stacked within a slot 340 disposed in top cover 80 of display member 104. In this embodiment, buttons 322, 324, and 326 are spring loaded, thereby pushing one or more of lenses 332, 334, and 336 up when one or more of buttons 322, 324, or 326 are selected. Lenses 332, 334, and 336 move down and/or are released when buttons 322, 324, or 326 are deselected. In an alternative embodiment, buttons 322, 324, and 326 comprise a spring device and/or a rotating device such that lenses 332, 334, and 336 can rotate clockwise or counter-clockwise over light source 132. In this embodiment, lenses 332, 334, and 336 can be disposed parallel to each other in slot 340. Lenses 332, 334, and 336 move down and/or are released when buttons 322, 324, or 326 are deselected. It should be noted, however, that buttons 322, 324, and 326 may use other types of devices or mechanisms to push up/down and/or rotate lenses 332, 334, and 336 over light source 132.

In operation, a user selects one of buttons 322, 324, or 326 on interface 320, which moves corresponding lens 332, 334, or 336 in front of light source 132. The change of lens covering light source 132 changes the amount of light emitted from light source 132. In some embodiments, only one lens, 332, 334, or 336, can cover light source 132 at any one time. However, alternate embodiments enable more than one lens can cover light source 132 at any one time.

Thus, embodiments of electronic device 100 may be manufactured by providing a shutter assembly comprising at least one lens to cover a light source. Electronic device 100 may also be manufactured by providing at least one lens comprising a plurality of different opacity portions. Electronic device 100 may also be manufactured by providing a slider enabling at least one lens to slide over the light source. Electronic device 100 may also be manufactured by providing at least one lens that is rotatable over the light source. Electronic device 100 may also be manufactured by providing an interface configured to cause at least one lens to be disposed over light source. Electronic device 100 may also be manufactured by providing an interface configured to cause a plurality of lenses to be disposed over a light source.

The illustrative embodiments provides a number of embodiments of lighting system 130 for electronic device 100. Lighting system 130 reduces costs associated with circuitry and managing complexity of electronic device 100. Furthermore, lighting system 130 potentially reduces the overall power usage in electronic device 100 compared to PWMs. Thus, in some embodiments, electronic device 100 may be manufactured by providing a shutter assembly comprising at least one movable lens to cover a light source. In some embodiments, electronic device 100 may be manufactured by providing at least one lens comprising a plurality of different opacity portions, or providing a plurality of lenses each comprising a plurality of different opacity portions. In some embodiments, electronic device 100 may be manufactured by providing a slider enabling at least one lens to slide over the light source, or by providing at least one lens being rotatable over the light source. In some embodiments, electronic device 100 may be manufactured by providing an interface configured to cause at least one lens to be disposed over the light source, or by providing an interface configured to cause a plurality of lenses to be selectively disposed over the light source.

What is claimed is:

1. An electronic device, comprising:
   a base having a working surface;
   a display rotably coupled to the base; and
   a lighting system including a light source that illuminates the working surface and a lens that moves to change an amount of light transmitting through the lens to the working surface, wherein the lens includes plural different opacity portions.

2. An electronic device, comprising:
   a base having a working surface;
   a display rotably coupled to the base; and
   a lighting system including a light source that illuminates the working surface and a lens that moves to change an amount of light transmitting through the lens to the working surface, wherein the lens is treated to add tint or color and movable to change a color of light transmitted through the lens to the working surface.

3. The electronic device of claim 1, wherein the lighting system further includes a slider connected to the lens, the slider movable along a slot to change an intensity level of light output through the lens to the working surface.

4. The electronic device of claim 1, wherein the lens is circular and includes plural different opacity portions.

5. The electronic device of claim 1, wherein the lighting system further includes a knob that rotates to change an intensity level of light output through the lens to the working surface.

6. A computer, comprising:
   a base having a working surface;
   a display connected to the base; and
   a lighting system including a light source that illuminates the working surface and a lens having different opacity portions that change an amount of light transmitting through the lens to the working surface, wherein the lens includes a plurality of different colors to change an amount of light being transmitted through the lens.

7. The computer of claim 6, wherein the lighting system is disposed in a top cover of a housing of the display.

8. The computer of claim 6, wherein the lighting system is integrated into and forms part of a housing of the electronic device.

9. The computer of claim 6, wherein the lens changes a color of light transmitting to the working surface.

10. The computer of claim 6, wherein the lens rotates to change the amount of light transmitting to the working surface.

11. The computer of claim 6, wherein the lighting system further includes an indicator that indicates directions the lens is movable to change the amount of light transmitting to the working surface.

12. A laptop computer, comprising:
 a base having a working surface;
 a display rotatably coupled to the base; and
 a lighting system in a housing of the display and including a light source that illuminates the working surface and a lens having different opacity portions that change an amount of light transmitting through the lens to the working surface.

13. The laptop computer of claim 12, wherein the lens includes a plurality of different colors to change a color of light being transmitted through the lens and to the working surface.

14. The laptop computer of claim 12, wherein the lighting system includes plural different and separate lenses that are stacked in a slot.

15. The laptop computer of claim 12, wherein the lighting system includes plural different lenses and plural buttons, and actuation of each one of the plural buttons selects one of the plural different lenses to change the amount of light transmitting through the lens to the working surface.

16. The laptop computer of claim 12, wherein the lens is rectangular.

* * * * *

UNITED STATES PATENT AND TRADEMARK OFFICE
CERTIFICATE OF CORRECTION

| | | |
|---|---|---|
| PATENT NO. | : 7,641,362 B2 | Page 1 of 1 |
| APPLICATION NO. | : 11/799270 | |
| DATED | : January 5, 2010 | |
| INVENTOR(S) | : Brian D. Ryder et al. | |

It is certified that error appears in the above-identified patent and that said Letters Patent is hereby corrected as shown below:

In column 4, line 34, in Claim 1, delete "rotably" and insert -- rotatably --, therefor.

In column 4, line 42, in Claim 2, delete "rotably" and insert -- rotatably --, therefor.

Signed and Sealed this

Thirteenth Day of April, 2010

David J. Kappos
*Director of the United States Patent and Trademark Office*